United States Patent
Vemuri et al.

(10) Patent No.: US 12,250,153 B2
(45) Date of Patent: Mar. 11, 2025

(54) SYSTEMS AND METHODS FOR QUALITY OF SERVICE TREATMENT OF NETWORK TRAFFIC BASED ON TRAFFIC ATTRIBUTES

(71) Applicant: Verizon Patent and Licensing Inc., Basking Ridge, NJ (US)

(72) Inventors: Bharadwaj Vemuri, Bear, DE (US); Deepa Jagannatha, Bridgewater, NJ (US); Lily Zhu, Parsippany, NJ (US); Samirkumar Patel, Middlesex, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 312 days.

(21) Appl. No.: 17/816,444

(22) Filed: Aug. 1, 2022

(65) Prior Publication Data
US 2024/0039854 A1   Feb. 1, 2024

(51) Int. Cl.
*H04L 47/24* (2022.01)
(52) U.S. Cl.
CPC ..................... *H04L 47/24* (2013.01)
(58) Field of Classification Search
CPC ....................................................... H04L 47/24
See application file for complete search history.

(56) References Cited

U.S. PATENT DOCUMENTS

| | | | | |
|---|---|---|---|---|
| 12,052,658 | B2* | 7/2024 | Asthana | H04W 48/18 |
| 2021/0227457 | A1* | 7/2021 | Jagannatha | H04W 8/183 |
| 2022/0377131 | A1* | 11/2022 | Szilagyi | H04L 41/0894 |
| 2023/0037685 | A1* | 2/2023 | Han | H04L 41/0893 |
| 2023/0217347 | A1* | 7/2023 | Fu | H04W 40/02 370/254 |
| 2023/0337105 | A1* | 10/2023 | Manning | H04W 40/12 |

* cited by examiner

*Primary Examiner* — Philip C Lee (57) ABSTRACT

A device described herein may maintain information associating sets of traffic attributes with respective sets of Quality of Service ("QoS") parameters, and may receive a request to establish a traffic flow. The request may indicate one or more traffic attributes associated with the requested traffic flow. The device may compare the one or more traffic attributes, included in the request, to the information associating the sets of traffic attributes with the respective sets of QoS parameters, identify a particular set of QoS parameters with which the traffic flow is associated, establish a communication session with a network based on the particular set of QoS parameters, communicate traffic, associated with the traffic flow, with the network via the established communication session. The device may include an application programming interface ("API") via which an application associated with the traffic flow may specify the traffic attributes in the request.

20 Claims, 8 Drawing Sheets

SYSTEMS AND METHODS FOR QUALITY OF SERVICE TREATMENT OF NETWORK TRAFFIC BASED ON TRAFFIC ATTRIBUTES

BACKGROUND

Wireless networks may be used for the wireless transmission of various applications and/or types of traffic, such as voice call traffic, messaging traffic, audio and/or video streaming traffic, file download traffic, and/or other types of traffic. Different types of traffic may have different Quality of Service ("QoS") requirements, routing rules, or the like. For example, voice call traffic may have lower latency requirements than file download traffic, and file download traffic may have higher throughput requirements than voice call traffic. Some applications may be associated with different types of traffic. For example, a web browser application may be used for cloud gaming sessions, videoconferencing sessions, etc.

DETAILED DESCRIPTION OF EXAMPLE EMBODIMENTS

The following detailed description refers to the accompanying drawings. The same reference numbers in different drawings may identify the same or similar elements.

Embodiments described herein provide for QoS treatment of traffic associated with network applications executing at a User Equipment ("UE") (e.g., a mobile telephone, a tablet, a laptop computer, etc.), without requiring that such network applications specifically request particular QoS parameters. Further, embodiments described herein provide for the same application to be associated with different types or classes of traffic, for which different QoS treatment may be provided by one or more networks that receive, carry, route, etc. such traffic. For example, while some network applications may be specifically configured to request particular QoS parameters, other network applications may not be configured to request such parameters. For example, a developer of such network applications may not be aware of particular QoS parameters, or the network applications may be general purpose applications (e.g., web browsers) that may be used for multiple different traffic types or services (e.g., voice call services, videoconferencing services, cloud gaming services, augmented reality ("AR") services, etc.).

Figure 1:
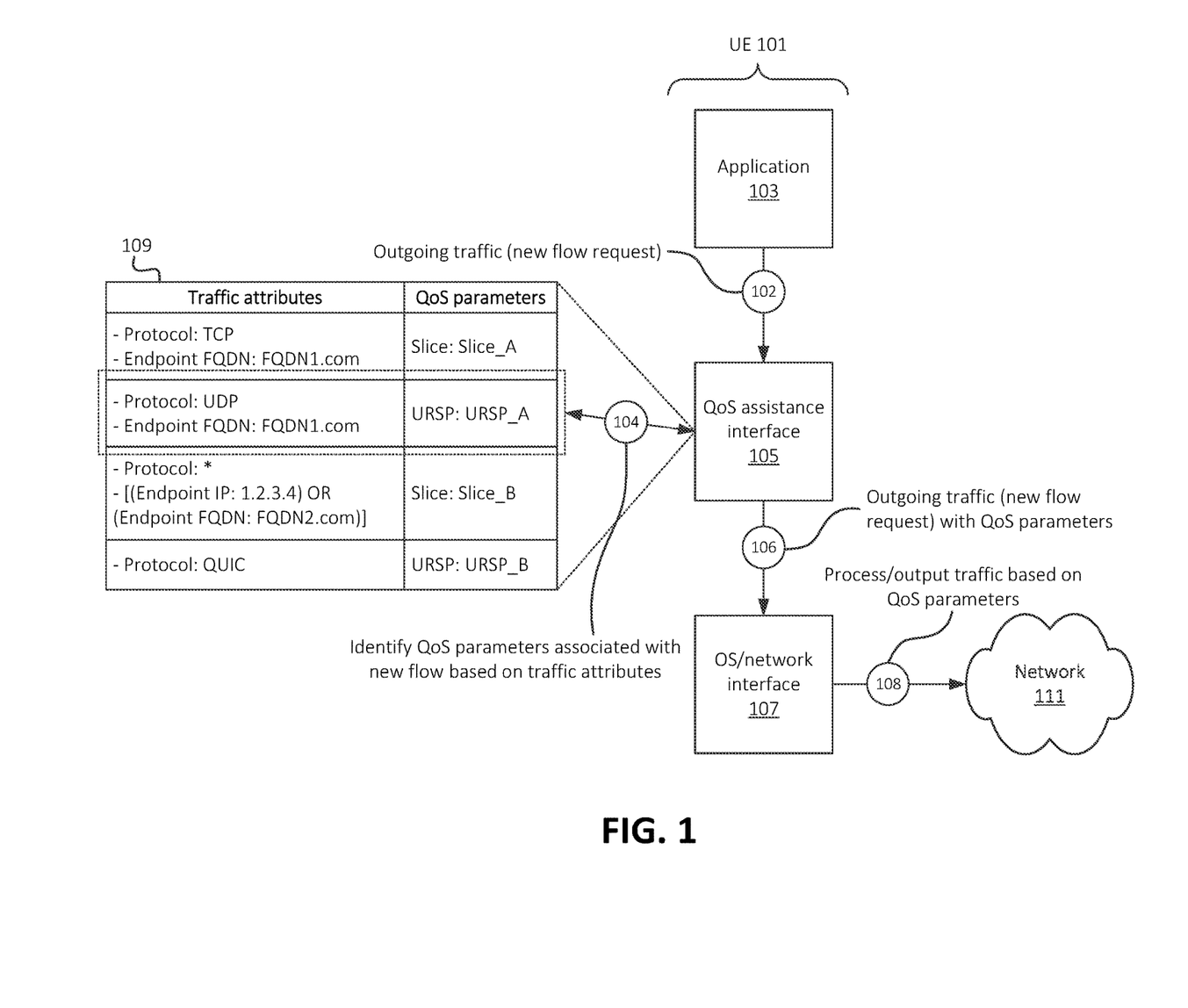
FIGS. 1 and 2 illustrate an example overview of one or more embodiments described herein.

As shown in FIG. 1, for example, a particular UE 101 may include (e.g., execute, run, etc.) one or more applications 103. Applications 103 may include applications that communicate with one or more other devices, systems, networks, etc. in order to provide a particular user experience or service at UE 101, such as voice call services, gaming services, etc. In accordance with some embodiments, UE 101 may also include, implement, etc. QoS Assistance Interface ("QAI") 105. In some embodiments, QAI 105 may be, may include, may implement, etc. an application programming interface ("API"), a protocol, or the like, via which application 103 may specify attributes of traffic flows associated with application 103. A given traffic flow associated with application 103, as discussed herein, may refer to an endpoint, such as another device or system (e.g., another UE 101, an application server, or the like), with which application 103 communicates.

As one example, application 103 may include a web browser application with multiple tabs or windows. In accordance with embodiments described herein, application 103 may associate each tab or window with a particular traffic flow. For example, a user of UE 101 may use application 103 to navigate to a first website (e.g., a first website via which a particular service is provided, such as a videoconferencing service, a gaming service, etc.) in a first tab, and may further navigate to a second website (e.g., a second website via which a different service is provided) in a second tab. For each tab, application 103 may output (at 102) a request to QAI 105 to establish a new traffic flow. In the example of FIG. 1, the establishment of a single traffic flow is shown; in practice, some or all of the operations shown in FIG. 1 may be performed multiple times, in order to provide for multiple flows with multiple different QoS parameters to be established for the same particular application 103.

Application 103 may, for example, output (at 102) the new traffic flow request to QAI 105, which may be an application installed and/or executing on UE 101. Additionally, or alternatively, application 103 may include an API that is implemented by an operating system ("OS") or other component of UE 101, and application 103 may output (at 102) the new traffic flow request to the OS (e.g., OS/network interface 107) in accordance with a format, protocol, etc. specified by such API.

As shown, QAI 105 may include, may interface with, may look up, and/or may otherwise be associated with data structure 109. In some embodiments, data structure 109 may include a mapping between traffic attributes (e.g., attributes of traffic associated with a flow request) and particular QoS parameters. In this manner, traffic having different attributes (e.g., associated with different endpoints, protocols, and/or other attributes) may be associated with different QoS parameters, and different types of traffic sent and/or received by application 103 may be treated according to such QoS parameters without requiring application 103 to request such QoS parameters specifically. For example, as discussed above, a developer or provider of application 103 may not need to specify QoS parameters associated with application 103, at least by virtue of the operations performed by QAI 105 in accordance with some embodiments, as discussed herein.

As shown, for example, data structure 109 may include information associating particular sets of traffic attributes with particular QoS parameters. Traffic attributes may include, for example, a protocol associated with the traffic, locator information (e.g., a Fully Qualified Domain Name ("FQDN"), an Internet Protocol ("IP") address, a Uniform Resource Locator ("URL"), etc.) of an endpoint with which the traffic is associated, and/or other traffic attributes. In some embodiments, the traffic attributes may include a name or other identifier of a particular service or type of service (e.g., an indication that particular traffic is voice call traffic, gaming traffic, etc., or is associated with a particular voice call service, gaming service, etc.), and/or other suitable traffic attributes. In some embodiments, the traffic attributes may include an application identifier, a Service Level Agreement ("SLA") or minimum performance thresholds (e.g., minimum bandwidth, maximum latency, etc.), and/or other suitable information. In some embodiments, the traffic attributes may be the same information, or same type of information, that is included in header information of respective traffic (e.g., in an IP header or other type of header). In some embodiments, the traffic attributes may be, may include, and/or may be based on one or more traffic descriptors.

The QoS parameters, included in data structure 109, may include an identifier of a particular network slice (e.g., where a wireless network may provide differentiated QoS treatment to traffic associated with different network slices), an identifier of one or more UE Route Selection Policy ("URSP") rules, a QoS class identifier, and/or other suitable QoS parameters. In this example, data structure 109 includes both slice identifiers (represented by example slice identifiers "Slice_A" and "Slice_B") and URSP rules (represented by example URSP rule identifiers "URSP_A" and "URSP_B"). In some embodiments, the slice identifiers and/or URSP rules may be represented by other identifiers. For example, slice identifiers may include Network Slice Selection Assistance Information ("NSSAI") values or other slice identifying values. In practice, data structure 109 may include only one type of QoS parameter (e.g., only URSP rules, only slice identifiers, etc.) and/or may include other types of QoS parameters than those shown here.

Data structure 109 may indicate, for example, that traffic flows associated with a Transmission Control Protocol ("TCP") protocol and an endpoint with the example FQDN "FQDN1.com" are associated with Slice_A, and that traffic flows associated with a User Datagram Protocol ("UDP") protocol and the same endpoint FQDN "FQDN1.com" are associated with URSP_A. That is, different QoS parameters may apply to traffic flows associated with the same FQDN, but with different protocols. In some embodiments, the attributes may be specified with one or more logical operators, conditions, criteria, regular expressions, etc. For instance, data structure 109 indicates that traffic associated with any protocol (as denoted by the "*" character or some other wildcard indicator), as well as with an endpoint having the IP address 1.2.3.4 or the FQDN "FQDN2.com" is associated with Slice_B.

In some embodiments, the information included in data structure 109 may specify sets or types of traffic attributes. For example, as noted above, one set of traffic attributes, specified in data structure 109, may include an endpoint IP address, while other sets of traffic attributes may not include an endpoint IP address. Further, in some embodiments, in lieu of including a wildcard character (e.g., "Protocol: *" as discussed above), data structure 109 may omit such criteria. For example, in lieu of including the attribute "Protocol: *", data structure 109 may omit the "Protocol" field entirely for that particular record of data structure 109, where such omission may be interpreted (e.g., by QAI 105) the same as if a wildcard character were included. For example, as further shown in data structure 109, traffic flows associated with the QUIC protocol and any endpoint (e.g., as denoted by the lack of an "endpoint" field in the associated record of data structure 109) may be associated with URSP_B.

QAI 105 may accordingly identify (at 104) the associated QoS parameters for the traffic flow requested (at 102) by application 103. In some embodiments, QAI 105 may identify the associated with QoS parameters without performing deep packet inspection, and/or otherwise without analyzing traffic from application 103. For example, the request (at 102) may specify the particular traffic attributes associated with the requested flow. In some embodiments, QAI 105 may be, or may be associated with, an API that includes one or more methods, functions, subroutines, etc. via which application 103 may request (at 102) the new traffic flow and/or via which application 103 may specify the traffic attributes associated with the traffic flow. Application 103 may implement such API, which may include calling, executing, etc. one or more of such methods, functions, subroutines, etc. Further, calling, executing, etc. the methods, functions, etc. associated with the API may include passing the traffic attributes of the requested traffic flow as parameters. As the traffic attributes may be identical to, may be based on, may be extracted from, etc. header information associated with traffic that is sent by application 103 (e.g., traffic associated with the requested flow), the processing by application 103 in order to include such attributes in the flow request may be relatively minimal. That is, the processing by application 103, to include the traffic attributes in the flow request, may be less intensive or time-consuming than the processing that QAI 105, OS/network interface 107, and/or other components of UE 101 would be to perform deep packet inspection or other techniques to identify such attributes.

Once QAI 105 determines (at 104) the QoS parameters associated with the flow request, QAI 105 may forward (at 106) the flow request, along with an indication of the identified QoS parameters, to OS/network interface 107. OS/network interface 107 may, for example, provide access to processor resources, network resources, memory resources, storage resources, and/or other resources of UE 101 to application 103. OS/network interface 107 may facilitate communications between UE 101 (e.g., communications associated with one or more applications 103 and one or more networks, such as network 111.

Based on the received (at 106) flow request and indication of the identified QoS parameters (e.g., slice identifier, URSP rule identifier, etc.), OS/network interface 107 may process and/or output (at 108) traffic, associated with the requested flow, to network 111 based on the QoS parameters. In some embodiments, for example, OS/network interface 107 may communicate with network 111 to establish one or more communication sessions, such as protocol data unit ("PDU") sessions and/or other types of sessions, between UE 101 and network 111. Such communication sessions may be established according to the identified QoS parameters, such that network 111 performs QoS treatment (e.g., applies queue priority, resource allocations, SLAs, Data Network Names ("DNNs"), routing parameters, etc.) commensurate with the identified QoS parameters. In some embodiments, OS/network interface 107 may queue, prioritize, etc. traffic associated with the flow according to the QoS parameters. For example, OS/network interface 107 may prioritize, queue, etc. the traffic associated with the flow, as compared to traffic associated with other flows, based on respective QoS parameters associated with the flows.

In some embodiments, QAI 105 and/or OS/network interface 107 may further generate, maintain, etc. one or more flow identifiers associated with the new flow, and may provide such flow identifier(s) to application 103. QAI 105 and/or OS/network interface 107 may further maintain information associating such flow identifier(s) with the identified QoS parameters. In this manner, application 103 may include the flow identifier in subsequent traffic matching the same traffic attributes, and QAI 105 and/or OS/network interface 107 may use the flow identifier to identify the previously identified QoS parameters. OS/network interface 107 may accordingly process such subsequent traffic according to such QoS parameters. For example, OS/network interface 107 may output the subsequent traffic via a PDU session between UE 101 and network 111 that is associated with a particular network slice with which the flow is associated, and/or may indicate the network slice (and/or other types of QoS parameters) with which the flow is associated.

Figure 2:
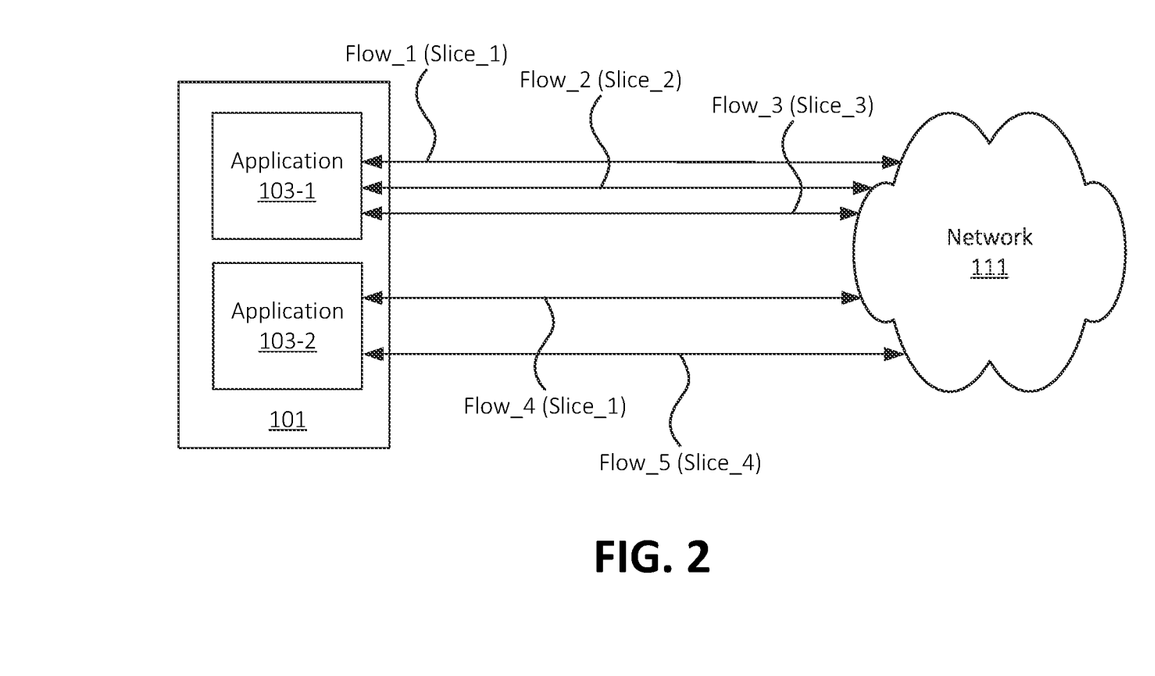

As noted above, multiple iterations of the above operations may be performed by one or multiple applications 103 executing at UE 101. For example, as shown in FIG. 2, UE 101 may execute two applications 103-1 and 103-2. In this example, three separate flows (Flow_1, Flow_2, and Flow_3) may have been established based on three iterations of the above operations with respect to application 103-1, and two separate flows (Flow_4 and Flow_5) may have been established based on two iterations of the above operations with respect to application 103-2. As shown, each flow may be associated with a particular network slice. As further shown, applications 103-1 and 103-2 may both be associated with different flows that are associated with the same slice. That is, example Flow_1 (associated with application 103-1) and Flow_4 (associated with application 103-2) are both associated with Slice_1. In some embodiments, UE 101 (e.g., QAI 105 and/or OS/network interface 107) may establish two separate communication sessions (e.g., PDU sessions or other types of communication sessions) between UE 101 and network 111, where one of the two communication sessions is associated with Flow_1 and where the other communication session is associated with Flow_4. In some embodiments, UE 101 may use the same communication session between UE 101 and network 111 for Flow_1 and Flow_4, and may internally route incoming traffic received via such communication session (e.g., from network 111) to application 103-1 or application 103-2, as appropriate.

Figure 3:
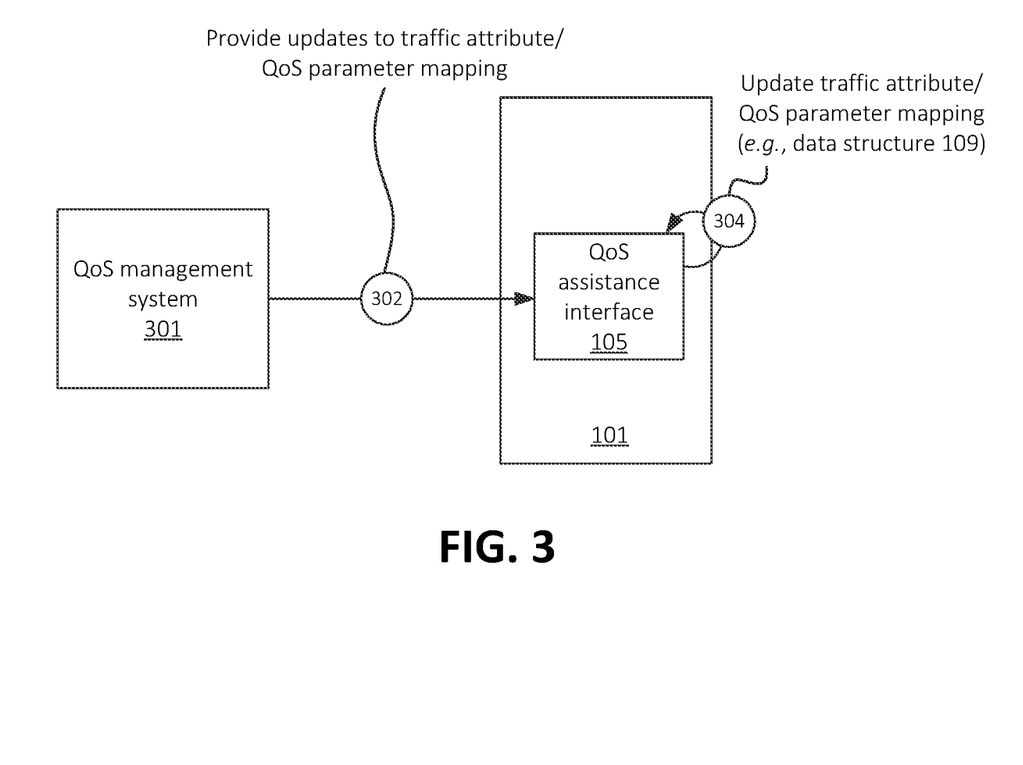
FIG. 3 illustrates an example update procedure for mapping information associating sets of traffic attributes to sets of QoS parameters, in accordance with some embodiments.

In some embodiments, QAI 105 may receive dynamically updated information that associates particular traffic attributes with particular QoS parameters. For example, as shown in FIG. 3, QAI 105 may receive (at 302) updates to information mapping particular traffic attributes to particular QoS parameters from QoS Management System ("QMS") 301. QAI 105 may receive such updates via an API, Over-the-Air ("OTA") updates, OS updates, user-initiated update procedures, etc. In some embodiments, QAI 105 may authenticate QMS 301 and/or otherwise verify validity of the provided update using one or more suitable authentication mechanisms (e.g., token exchange, key-based encryption, etc.). In some embodiments, QMS 301 may provide such updates periodically, intermittently, or on some other ongoing basis. For example, QMS 301 may utilize artificial intelligence/machine learning ("AI/ML") techniques or other suitable techniques to determine optimal, preferred, etc. sets of mappings between traffic attributes and QoS parameters. For instance, QMS 301 may identify that a previously provided set of QoS parameters associated with a given FQDN results in traffic latency that exceeds a threshold latency associated with a traffic type or service associated with traffic sent to or received by UEs 101 to and/or from an application server with which the FQDN is associated. In this example, QMS 301 may associate the same FQDN with a different set of QoS parameters (e.g., a network slice with higher priority, with an SLA associated with lower latency, etc.), and may provide (at 302) updated information to one or more UEs 101 (e.g., QAIs 105 associated with such UEs 101) indicating the newly selected QoS parameters.

As another example, QMS 301 may identify (e.g., based on receiving information from a RAN and/or one or more devices or systems that monitor load metrics of a RAN) that a particular set of UEs 101 are connected to a portion of a RAN (e.g., a particular base station, a particular cell, etc.) that is experiencing a measure of load that exceeds a threshold measure of load, and may modify QoS parameters associated with one or more traffic attributes in order to alleviate user experience degradations that may result from the excessive RAN load. In such embodiments, QMS 301 may provide (at 302) the updated mapping information to affected UEs 101 (e.g., UEs 101 connected to the particular base station, cell, etc.) without providing the updated mapping information to other UEs 101 (e.g., UEs 101 that are connected to other portions of the RAN).

As yet another example, QMS 301 may receive information indicating that a particular network slice is congested. QMS 301 may modify the mapping information to reduce the amount of traffic attributes that are associated with the particular network slice. For example, QMS 301 may associate a particular endpoint FQDN, that was previously associated with the congested network slice, with a different network slice.

Based on receiving (at 302) the updated mapping information, QAI 105 may update (at 304) mapping information stored by and/or otherwise associated with QAI 105. For example, QAI 105 may modify data structure 109 to reflect the updated mapping information. In some embodiments, QAI 105 and/or OS/network interface 107 may automatically associate traffic flows, associated with application 103, with different QoS parameters based on the received updates. For example, QAI 105 and/or OS/network interface 107 may identify that the updated mapping information indicates that the QoS parameters for an existing traffic flow have changed (e.g., from a first network slice to a second network slice). In some embodiments, OS/network interface 107 may establish a new communication session, associated with the second network slice, with network 111, and may send traffic associated with the existing traffic flow to network 111 via the new communication session. In this manner, QoS parameters for particular traffic attributes may be modified (e.g., by a network operator or other entity associated with QMS 301 and/or QAI 105) without requiring intervention from application 103. For example, such modifying may not require application 103 to output a new flow request.

Figure 4:
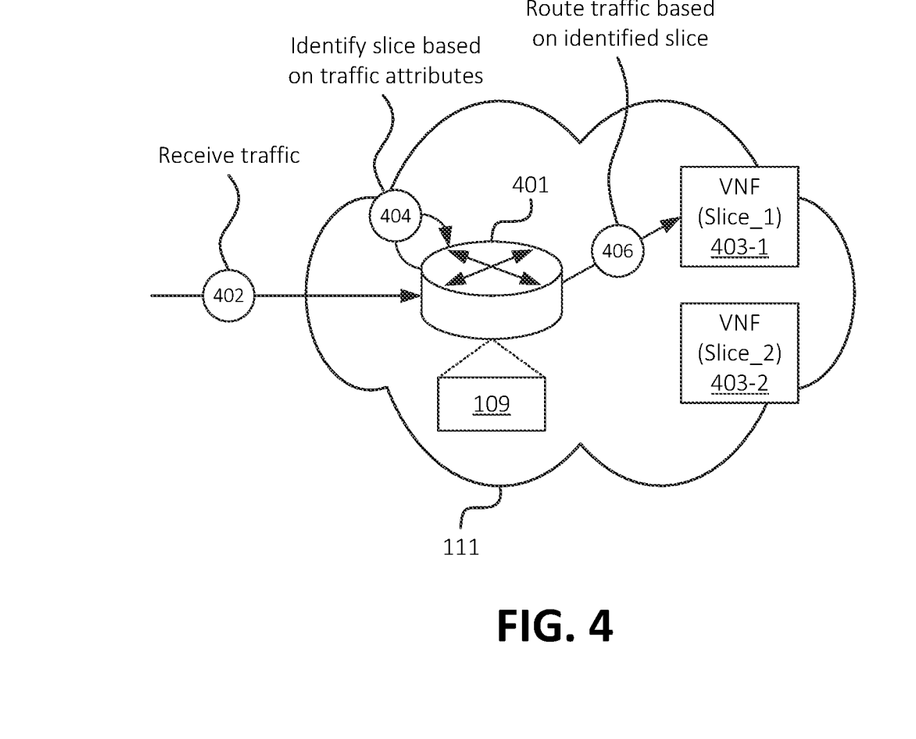
FIG. 4 illustrates an example of a network device identifying QoS parameters associated with traffic based on attributes of the traffic, in accordance with some embodiments.

In some embodiments, other techniques may be used to associate particular traffic attributes with particular QoS parameters. For example, as shown in FIG. 4, network device 401 (e.g., a router, hub, etc.) of network 111 may maintain mapping information, associating particular sets of traffic attributes to particular QoS parameters an instance of (e.g., data structure 109). As further shown, network 111 may further include different instances 403-1 and 403-2 of a particular Virtualized Network Function ("VNF"), such as different instances of a User Plane Function ("UPF") or other type of network function. In this example, VNF instance 403-1 is associated with a first network slice (e.g., Slice_1), and VNF instance 403-2 is associated with a second network slice (e.g., Slice_2). That is, VNF instance 403-1 may be configured to treat traffic associated with a first set of QoS parameters, and VNF instance 403-2 may be configured to treat traffic associated with a second set of QoS parameters.

In this example, assume that network device 401 receives (at 402) particular traffic, which may be sent from a given UE 101 or other source. Network device 401 may identify (at 404) traffic attributes of the traffic, which may include inspecting header information of the traffic in order to identify the appropriate traffic attributes (e.g., endpoint FQDN, protocol, etc.). Network device 401 may identify a slice, with which the traffic is associated, based on comparing the traffic attributes to the mapping information (e.g., data structure 109), and may accordingly route (at 406) the traffic to the appropriate VNF instance 403. In this example, network device 401 may have identified that the traffic is associated with Slice_1, and may accordingly route (at 406) the traffic to VNF instance 403-1.

Figure 5:
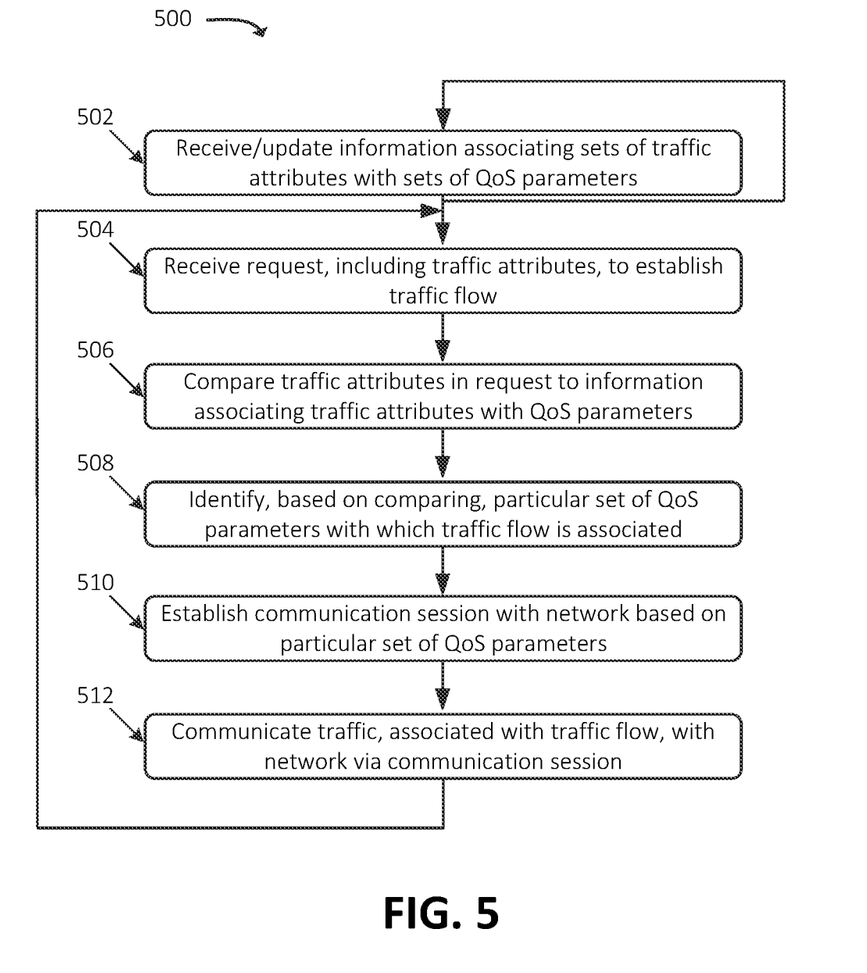
FIG. 5 illustrates an example process for establishing a communication session with a network in accordance with QoS parameters determined based on traffic attributes, in accordance with some embodiments.

FIG. 5 illustrates an example process 500 for establishing a communication session with a network (e.g., network 111) in accordance with QoS parameters determined based on traffic attributes. In some embodiments, some or all of process 500 may be performed by UE 101 (e.g., by QAI 105 and/or OS/network interface 107 of one or more UEs 101). In some embodiments, one or more other devices may perform some or all of process 500 in concert with, and/or in lieu of, UE 101.

As shown, process 500 may include receiving and/or updating (at 502) information associating sets of traffic attributes with sets of QoS parameters. For example, as discussed above, QAI 105, installed, implemented, executing, etc. at UE 101 may receive (e.g., from QMS 301 and/or some other source) mapping information associating particular sets of traffic attributes with respective sets of QoS parameters. In some embodiments, QAI 105 and/or a storage device associated with UE 101 may store, maintain, etc. data structure 109 based on the received mapping information. As discussed above, the mapping information may include rules, criteria, logical operators, etc. defining particular sets of traffic attributes, such as endpoint locator information (e.g., FQDNs, IP addresses, URLs, etc.), protocol information (e.g., TCP, UDP, etc.), and/or other suitable information. The mapping information may also include sets of QoS parameters with which particular traffic attributes are associated, such as network slice identifiers, URSP rule identifiers, and/or other suitable QoS indicators.

As noted above, QAI 105 may receive updated mapping information (e.g., from QMS 301 and/or some other source) on an ongoing basis, as the mapping information may change dynamically. The changes over time may be due to, for example, improving, refining, optimizing, etc. the performance and/or user experience based on various mappings, which may include performing one or more AI/ML techniques. Additionally, or alternatively, the changes may be due to the occurrence of events or other conditions, such as network load conditions, scheduled events at a given location, or other types of events or conditions.

Process 500 may further include receiving (at 504) a request to establish a traffic flow. In accordance with some embodiments, the request may include a set of traffic attributes associated with the traffic flow. For example, QAI 105 and/or OS/network interface 107 may receive the request from a particular application 103 executing at UE 101 to establish a traffic flow. For example, the request may be made by application 103 in response to a user selection via a graphical user interface ("GUI") or some other type of interface associated with application 103 to establish a communication session, to establish a gaming session, to establish a web browsing session, etc. In some embodiments, application 103 may include a web browser application that offers the ability to access multiple web pages or other network-accessible resources simultaneously. For example, the web browser application may allow the user to access multiple browser windows, tabs, etc. that each communicate with a respective web-accessible resource (e.g., a web server, an application server, a content streaming server, another UE 101, etc.). The request (at 504) may correspond to a particular tab, window, etc. via which application 103 communicates with a particular respective network-accessible resource.

In accordance with some embodiments, the request may include traffic attributes, such as locator information of an endpoint associated with the web-accessible resource, such as an FQDN, a URL, an IP address, etc. The traffic attributes may include a protocol associated with the requested flow, such as TCP, UDP, QUIC, etc. In some embodiments, the traffic attributes may include one or more other attributes or identifiers associated with the traffic and/or the endpoint. In some embodiments, the request may be formatted in a manner that is compatible with QAI 105. For example, the request may include a call or invocation of one or more functions, methods, subroutines, etc. provided by and/or implemented by an API associated with QAI 105, where calling or invoking such functions may include passing the traffic attributes as parameters to QAI 105 and/or OS/network interface 107. In some embodiments, application 103 may extract or otherwise identify the traffic attributes by analyzing header information associated with outgoing traffic associated with the requested flow, and/or the traffic attributes may otherwise be the same as header information that would be associated with outgoing traffic associated with the requested flow. As noted above, application 103 providing such information according to the API associated with QAI 105 may consume fewer processing resources of UE 101 and/or may take less time than if QAI 105 and/or OS/network interface 107 were to perform deep packet inspection or use other techniques to identify the traffic attributes associated with the requested flow. Application 103 providing the information in the request may further reduce the time needed before establishing the flow, as application 103 may request the establishment of the flow prior to any actual traffic associated with application 103 being generated for output by UE 101.

Process 500 may additionally include comparing (at 506) the traffic attributes, indicated in the request, to the mapping information associating the sets of traffic attributes and QoS parameters. Based on the comparing, process 500 may include identifying (at 508), based on the comparing, a particular set of QoS parameters with which the traffic flow is associated. For example, QAI 105 and/or OS/network interface 107 may compare the traffic attributes (e.g., as provided by application 103) to the sets of traffic attributes included in the mapping information (e.g., in data structure 109). In the event that the traffic attributes in the request match a particular set of traffic attributes in the mapping information, QAI 105 and/or OS/network interface 107 may identify the corresponding set of QoS parameters (e.g., network slice, USRP rule, and/or other QoS parameters) indicated in the mapping information. In situations where the mapping information includes logical operators, criteria, etc., QAI 105 and/or OS/network interface 107 may execute such logical operators and/or otherwise determine whether the criteria are met with respect to the requested set of traffic attributes.

Process 500 may further include establishing (at 510) a communication session with network 111 based on the particular set of QoS parameters. For example, OS/network interface 107 may request the establishment of a PDU session or other type of communication session between UE 101 and network 111 that is associated with the requested QoS parameters. Such communication session may be "associated with" the QoS parameters inasmuch as PDU sessions or other communication sessions may include or may be associated with context information or other information that may be maintained by routing devices, network repositories, and/or other network devices 401. Such context information may include QoS parameters such as slice information, DNN information, and/or other information based on which such routing devices, network devices 401, etc. may process, treat, queue, prioritize, route, etc. traffic that is associated with the given slice.

In some embodiments, QAI 105 and/or OS/network interface 107 may provide a flow identifier to application 103, which application 103 may use for subsequent traffic associated with the flow (e.g., associated with the same protocol, endpoint, etc.). For example, application 103 may include the flow identifier in header information associated with outgoing traffic that is sent after receiving the flow identifier. Process 500 may additionally include communicating (at 512) traffic, associated with the traffic flow, to network 111 via the communication session between UE 101 and network 111. For example, OS/network interface 107 may use the flow identifier to determine that the traffic is associated with the established (at 510) communication session between UE 101 and network 111.

As noted above, some or all of process 500 may be repeated, such that multiple flows (and corresponding communication sessions between UE 101 and network 111) may be established for the same application 103. In this manner, multiple types of traffic associated with the same application 103 may receive appropriate QoS treatment according to the type of service (e.g., which may correspond to the endpoint, protocol, and/or other traffic attributes), with minimal involvement of application 103 and reduced resource consumption compared to deep packet inspection of traffic associated with application 103.

Figure 6:
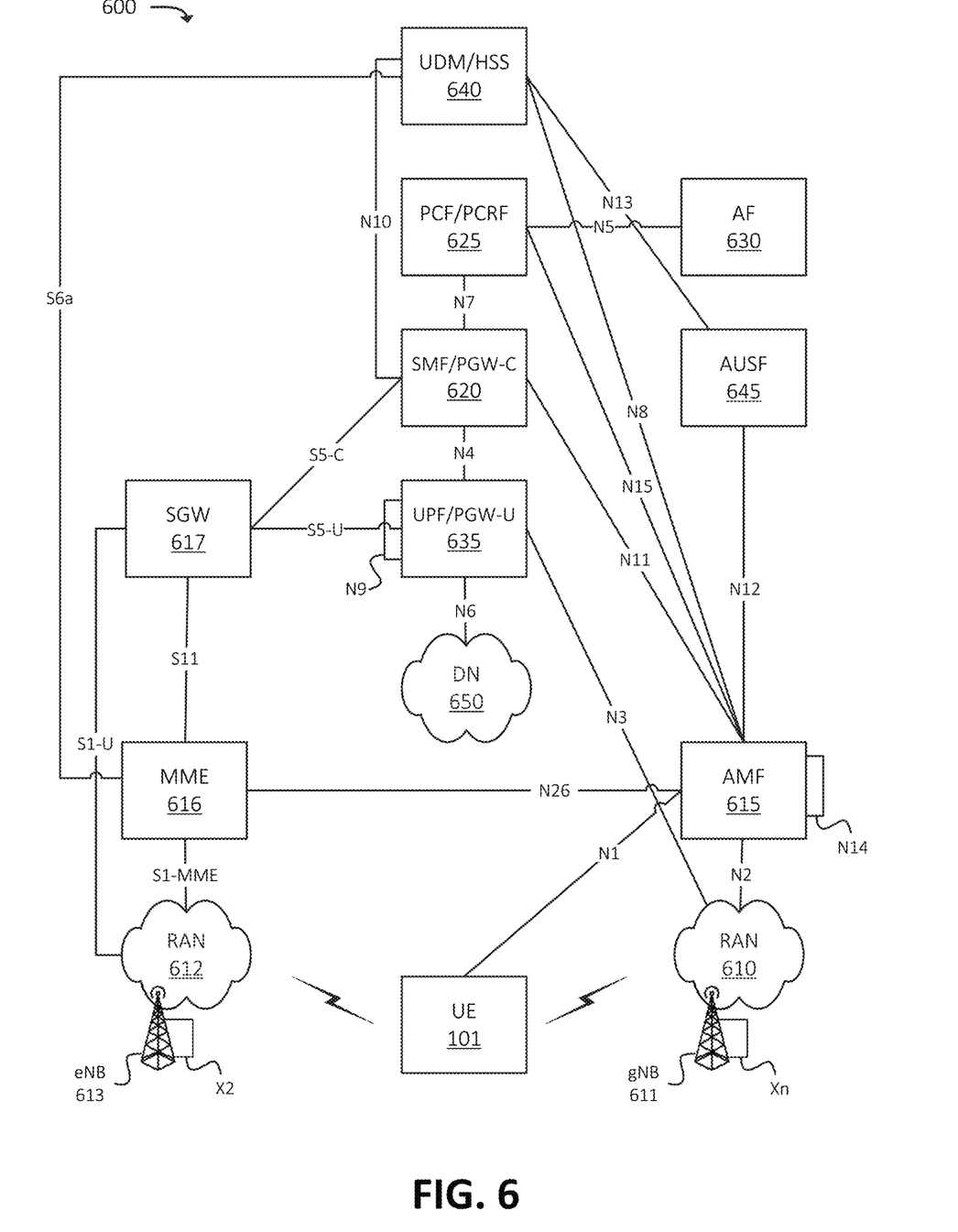
FIG. 6 illustrates an example environment in which one or more embodiments, described herein, may be implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 600 may represent or may include a 5G core ("5GC"). As shown, environment 600 may include UE 101, RAN 610 (which may include one or more Next Generation Node Bs ("gNBs") 611), RAN 612 (which may include one or more evolved Node Bs ("eNBs") 613), and various network functions such as Access and Mobility Management Function ("AMF") 615, Mobility Management Entity ("MME") 616, Serving Gateway ("SGW") 617, Session Management Function ("SMF")/Packet Data Network ("PDN") Gateway ("PGW")-Control plane function ("PGW-C") 620, Policy Control Function ("PCF")/Policy Charging and Rules Function ("PCRF") 625, Application Function ("AF") 630, UPF/PGW-User plane function ("PGW-U") 635, Unified Data Management ("UDM")/Home Subscriber Server ("HSS") 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650).

The example shown in FIG. 6 illustrates one instance of each network component or function (e.g., one instance of SMF/PGW-C 620, PCF/PCRF 625, UPF/PGW-U 635, UDM/HSS 640, and/or AUSF 645). In practice, environment 600 may include multiple instances of such components or functions. For example, in some embodiments, environment 600 may include multiple "slices" of a core network, where each slice includes a discrete and/or logical set of network functions (e.g., one slice may include a first instance of SMF/PGW-C 620, PCF/PCRF 625, UPF/PGW-U 635, UDM/HSS 640, and/or AUSF 645, while another slice may include a second instance of SMF/PGW-C 620, PCF/PCRF 625, UPF/PGW-U 635, UDM/HSS 640, and/or AUSF 645). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as network devices 401, routers, modems, gateways, switches, hubs, etc. Alternatively, or additionally, one or more of the devices of environment 600 may perform one or more network functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 101 may include a computation and communication device, such as a wireless mobile communication device that is capable of communicating with RAN 610, RAN 612, and/or DN 650. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 101 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 101 may communicate with one or more other elements of environment 600. UE 101 may communicate with RAN 610 via an air interface (e.g., as provided by gNB 611). For instance, RAN 610 may receive traffic (e.g., voice call traffic, data traffic, messaging traffic, signaling traffic, etc.) from UE 101 via the air interface, and may communicate the traffic to UPF/PGW-U 635, and/or one or more other devices or networks. Similarly, RAN 610 may receive traffic intended for UE 101 (e.g., from UPF/PGW-U 635, AMF 615, and/or one or more other devices or networks) and may communicate the traffic to UE 101 via the air interface.

RAN 612 may be, or may include, a LTE RAN that includes one or more base stations (e.g., one or more eNBs 613), via which UE 101 may communicate with one or more other elements of environment 600. UE 101 may communicate with RAN 612 via an air interface (e.g., as provided by eNB 613). For instance, RAN 612 may receive traffic (e.g., voice call traffic, data traffic, messaging traffic, signaling traffic, etc.) from UE 101 via the air interface, and may communicate the traffic to UPF/PGW-U 635, and/or one or more other devices or networks. Similarly, RAN 612 may receive traffic intended for UE 101 (e.g., from UPF/PGW-U 635, SGW 617, and/or one or more other devices or networks) and may communicate the traffic to UE 101 via the air interface.

AMF 615 may include one or more devices, systems, Virtualized Network Functions ("VNFs"), Cloud-Native Network Functions ("CNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 612 and/or eNBs 613, and/or to perform other operations.

SGW 617 may include one or more devices, systems, VNFs, CNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, CNFs, etc., that gather, process, store, and/or provide information in a manner described herein. SMF/PGW-C 620 may, for example, facilitate the establishment of communication sessions on behalf of UE 101. In some embodiments, the establishment of communications sessions may be performed in accordance with one or more policies provided by PCF/PCRF 625.

PCF/PCRF 625 may include one or more devices, systems, VNFs, CNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, CNFs, etc., that receive, store, and/or provide information that may be used in determining parameters (e.g., quality of service parameters, charging parameters, or the like) for certain applications.

UPF/PGW-U 635 may include one or more devices, systems, VNFs, CNFs, etc., that receive, store, and/or provide data (e.g., user plane data). For example, UPF/PGW-U 635 may receive user plane data (e.g., voice call traffic, data traffic, etc.), destined for UE 101, from DN 650, and may forward the user plane data toward UE 101 (e.g., via RAN 610, SMF/PGW-C 620, and/or one or more other devices). In some embodiments, multiple UPFs 635 may be deployed (e.g., in different geographical locations), and the delivery of content to UE 101 may be coordinated via the N9 interface (e.g., as denoted in FIG. 6 by the line marked "N9" originating and terminating at UPF/PGW-U 635). Similarly, UPF/PGW-U 635 may receive traffic from UE 101 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

UDM/HSS 640 and AUSF 645 may include one or more devices, systems, VNFs, CNFs, etc., that manage, update, and/or store, in one or more memory devices associated with AUSF 645 and/or UDM/HSS 640, profile information associated with a subscriber. AUSF 645 and/or UDM/HSS 640 may perform authentication, authorization, and/or accounting operations associated with the subscriber and/or a communication session with UE 101.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 101 may communicate, through DN 650, with data servers, other UEs 101, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 101 may communicate.

Figure 7:
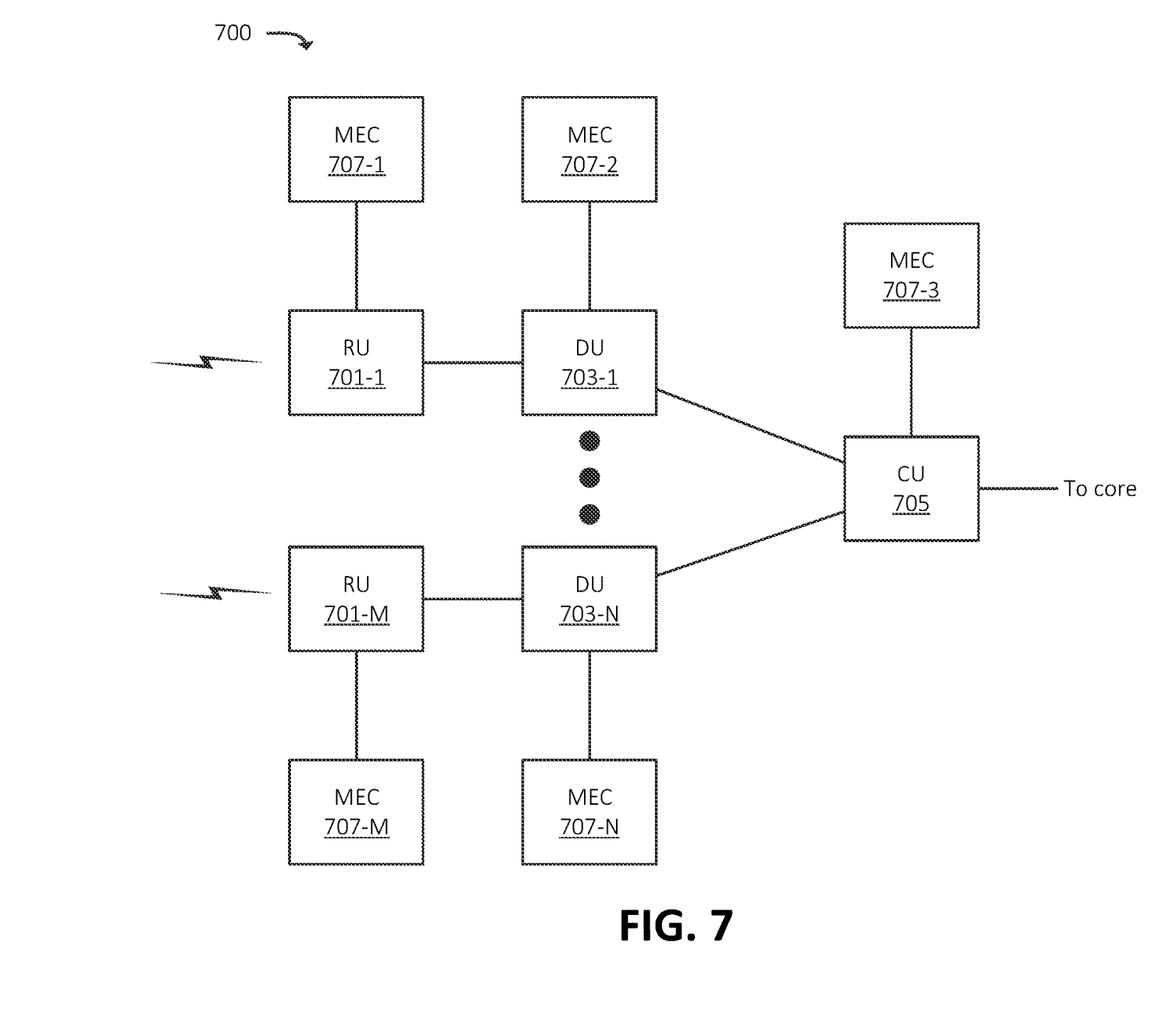
FIG. 7 illustrates an example arrangement of a radio access network ("RAN"), in accordance with some embodiments.

FIG. 7 illustrates an example Distributed Unit ("DU") network 700, which may be included in and/or implemented by one or more RANs (e.g., RAN 610, RAN 612, or some other RAN). In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNBs 611. In some embodiments, DU network 700 may correspond to one or more other types of base stations of one or more other types of RANs. As shown, DU network 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs 101 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 101, and may determine which DU(s) 703 should receive the downlink traffic. DU 703 may include one or more devices that transmit traffic between a core network (e.g., via CU 705) and UE 101 (e.g., via a respective RU 701). DU 703 may, for example, receive traffic from RU 701 at a first layer (e.g., physical ("PHY") layer traffic, or lower PHY layer traffic), and may process/ aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 101.

RU 701 may include hardware circuitry (e.g., one or more RF transceivers, antennas, radios, and/or other suitable hardware) to communicate wirelessly (e.g., via an RF interface) with one or more UEs 101, one or more other DUs 703 (e.g., via RUs 701 associated with DUs 703), and/or any other suitable type of device. In the uplink direction, RU 701 may receive traffic from UE 101 and/or another DU 703 via the RF interface and may provide the traffic to DU 703. In the downlink direction, RU 701 may receive traffic from DU 703, and may provide the traffic to UE 101 and/or another DU 703.

RUs 701 may, in some embodiments, be communicatively coupled to one or more Multi-Access/Mobile Edge Computing ("MEC") devices, referred to sometimes herein simply as "MECs" 707. For example, RU 701-1 may be communicatively coupled to MEC 707-1, RU 701-M may be communicatively coupled to MEC 707-M, DU 703-1 may be communicatively coupled to MEC 707-2, DU 703-N may be communicatively coupled to MEC 707-N, CU 705 may be communicatively coupled to MEC 707-3, and so on. MECs 707 may include hardware resources (e.g., configurable or provisionable hardware resources) that may be configured to provide services and/or otherwise process traffic to and/or from UE 101, via a respective RU 701.

For example, RU 701-1 may route some traffic, from UE 101, to MEC 707-1 instead of to a core network (e.g., via DU 703 and CU 705). MEC 707-1 may process the traffic, perform one or more computations based on the received traffic, and may provide traffic to UE 101 via RU 701-1. In this manner, ultra-low latency services may be provided to UE 101, as traffic does not need to traverse DU 703, CU 705, and an intervening backhaul network between DU network 700 and the core network. In some embodiments, MEC 707 may include, and/or may implement, some or all of the functionality described above with respect to UPF 635 and/or one or more other devices, systems, VNFs, CNFs, etc.

Figure 8:
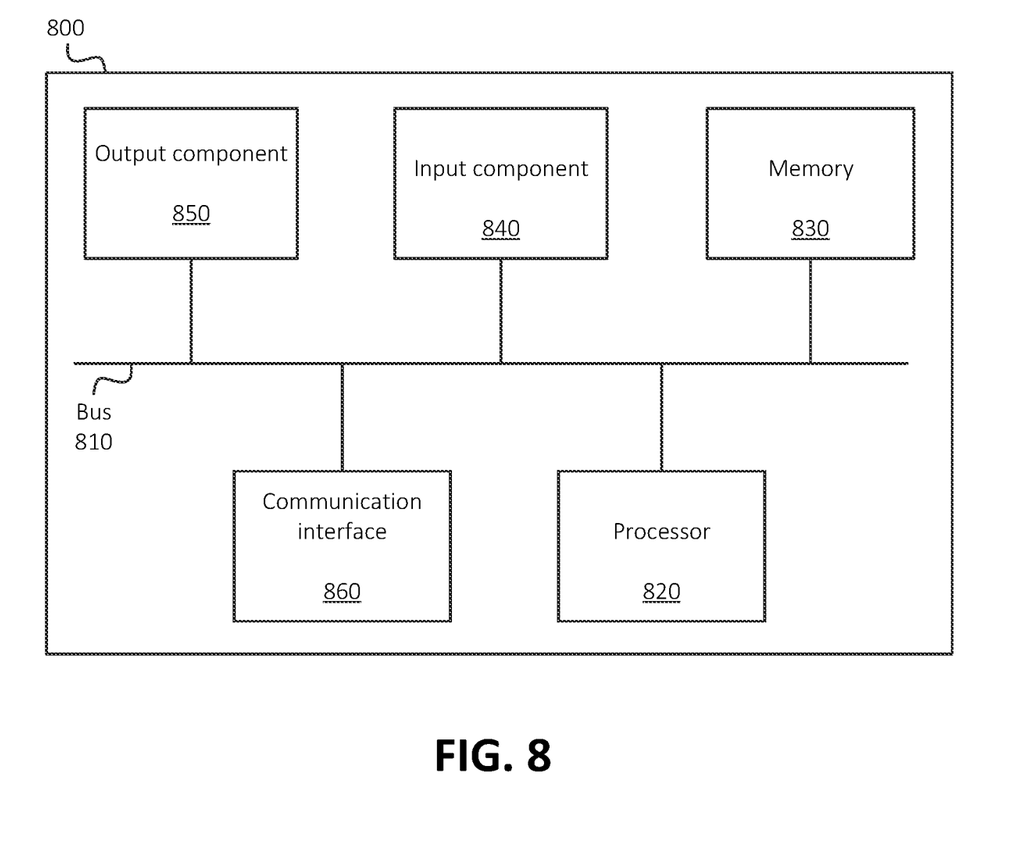
FIG. 8 illustrates example components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. In some embodiments, processor 820 may be or may include one or more hardware processors. Memory 830 may include any type of dynamic storage device that may store information and instructions for execution by processor 820, and/or any type of non-volatile storage device that may store information for use by processor 820.

Input component 840 may include a mechanism that permits an operator to input information to device 800 and/or other receives or detects input from a source external to 840, such as a touchpad, a touchscreen, a keyboard, a keypad, a button, a switch, a microphone or other audio input component, etc. In some embodiments, input component 840 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
execute a particular application that presents a plurality of tabs;
maintain information associating a plurality of sets of traffic attributes with respective sets of Quality of Service ("QoS") parameters;
receive a first request to establish a first traffic flow, wherein the first request indicates one or more traffic attributes associated with the requested first traffic flow, wherein the first request is initiated based on a first network resource accessed via a first tab of the plurality of tabs presented by the particular application;
receive a second request to establish a second traffic flow, wherein the second request indicates one or more traffic attributes associated with the requested second traffic flow, wherein the second request is initiated based on a second network resource accessed via a second tab of the plurality of tabs presented by the particular application;
compare the respective traffic attributes, included in the first and second requests, to the information associating the plurality of sets of traffic attributes with the respective sets of QoS parameters;
identify, based on the comparing, a first set of QoS parameters with which the first traffic flow is associated;
identify, based on the comparing, a second set of QoS parameters with which the second traffic flow is associated;
establish a first communication session with a network based on the first set of QoS parameters;
establish a second communication session with the network based on the second set of QoS parameters, wherein the first and second communication sessions are simultaneously active;
communicate traffic, associated with the first traffic flow, with the network via the established first communication session; and
communicate traffic, associated with the second traffic flow, with the network via the established second communication session.

2. The device of claim 1, wherein the particular application is a web browser application.

3. The device of claim 1, wherein the traffic attributes associated with the first traffic flow are based on header information associated with the first traffic flow, and wherein the traffic attributes associated with the second traffic flow are based on header information associated with the second traffic flow.

4. The device of claim 1, wherein the traffic attributes associated with the first traffic flow include a protocol associated with the first traffic flow.

5. The device of claim 1, wherein the first and second sets of QOS parameters each include at least one of:
one or more network slice identifiers, or
one or more UE Route Selection Policy ("URSP") rule identifiers.

6. The device of claim 1, wherein the one or more processors are further configured to:
   receive updated information associating the one or more traffic attributes, included in the first request, with a third set of QOS parameters in lieu of the first set of QOS parameters;
   establish a third communication session with the network based on the third set of QoS parameters; and
   communicate traffic, associated with the first traffic flow, with the network via the third communication session in lieu of the first communication session.

7. A non-transitory computer-readable medium, storing a plurality of processor-executable instructions to:
   execute a particular application that presents a plurality of tabs;
   maintain information associating a plurality of sets of traffic attributes with respective sets of Quality of Service ("QoS") parameters;
   receive a first request to establish a first traffic flow, wherein the first request indicates one or more traffic attributes associated with the requested first traffic flow, wherein the first request is initiated based on a first network resource accessed via a first tab of the plurality of tabs presented by the particular application;
   receive a second request to establish a second traffic flow, wherein the second request indicates one or more traffic attributes associated with the requested second traffic flow, wherein the second request is initiated based on a second network resource accessed via a second tab of the plurality of tabs presented by the particular application;
   compare the respective traffic attributes, included in the first and second requests, to the information associating the plurality of sets of traffic attributes with the respective sets of QoS parameters;
   identify, based on the comparing, a first set of QoS parameters with which the first traffic flow is associated;
   identify, based on the comparing, a second set of QoS parameters with which the second traffic flow is associated;
   establish a firstcommunication session with a network based on the first set of QoS parameters; establish a second communication session with the network based on the second set of QOS parameters, wherein the first and second communication sessions are simultaneously active;
   communicate traffic, associated with the first traffic flow, with the network via the established first communication session; and
   communicate traffic, associated with the second traffic flow, with the network via the established second communication session.

8. The non-transitory computer-readable medium of claim 7, wherein the particular application is a web browser application.

9. The non-transitory computer-readable medium of claim 7, wherein the traffic attributes associated with the first traffic flow are based on header information associated with the first traffic flow, and wherein the traffic attributes associated with the second traffic flow are based on header information associated with the second traffic flow.

10. The non-transitory computer-readable medium of claim 7, wherein the traffic attributes associated with the first traffic flow include a protocol associated with the first traffic flow.

11. The non-transitory computer-readable medium of claim 7, wherein the first and second sets of QOS parameters each include at least one of:
   one or more network slice identifiers, or
   one or more UE Route Selection Policy ("URSP") rule identifiers.

12. The non-transitory computer-readable medium of claim 7, wherein the plurality of processor-executable instructions further include processor-executable instructions to:
   receive updated information associating the one or more traffic attributes, included in the first request, with a third set of QOS parameters in lieu of the first set of QoS parameters;
   establish a third communication session with the network based on the third set of QoS parameters; and
   communicate traffic, associated with the first traffic flow, with the network via the third communication session in lieu of the first communication session.

13. A method, comprising:
   executing a particular application that presents a plurality of tabs;
   maintaining information associating a plurality of sets of traffic attributes with respective sets of Quality of Service ("QoS") parameters;
   receiving a first request to establish a first traffic flow, wherein the first request indicates one or more traffic attributes associated with the requested first traffic flow, wherein the first request is initiated based on a first network resource accessed via a first tab of the plurality of tabs presented by the particular application;
   receiving a second request to establish a second traffic flow, wherein the second request indicates one or more traffic attributes associated with the requested second traffic flow, wherein the second request is initiated based on a second network resource accessed via a second tab of the plurality of tabs presented by the particular application;
   comparing the respective traffic attributes, included in the first and second requests, to the information associating the plurality of sets of traffic attributes with the respective sets of QoS parameters;
   identifying, based on the comparing, a first set of QoS parameters with which the first traffic flow is associated;
   identifying, based on the comparing, a second set of QoS parameters with which the second traffic flow is associated;
   establishing a first communication session with a network based on the first set of QoS parameters; establishing a second communication session with the network based on the second set of QoS parameters, wherein the first and second communication sessions are simultaneously active;
   communicating traffic, associated with the first traffic flow, with the network via the established first communication session; and
   communicating traffic, associated with the second traffic flow, with the network via the established second communication session.

14. The method of claim 13, wherein the particular application is a web browser application.

15. The method of claim 13, wherein the traffic attributes associated with the first traffic flow include a protocol associated with the first traffic flow.

16. The method of claim 13, wherein the first and second sets of QoS parameters each include at least one of:

one or more network slice identifiers, or one or more UE Route Selection Policy ("URSP") rule identifiers.

17. The method of claim 13, further comprising:

receiving updated information associating the one or more traffic attributes, included in the first request, with a third set of QOS parameters in lieu of the first set of QoS parameters;

establishing a third communication session with the network based on the third set of QoS parameters; and communicating traffic, associated with the first traffic flow, with the network via the third communication session in lieu of the first communication session.

18. The method of claim 15, wherein the protocol associated with the first traffic flow includes at least one of:

a Transmission Control Protocol ("TCP"), or a User Datagram Protocol ("UDP").

19. The device of claim 4, wherein the protocol associated with the first traffic flow includes at least one of:

a Transmission Control Protocol ("TCP"), or a User Datagram Protocol ("UDP").

20. The non-transitory computer-readable medium of claim 10, wherein the protocol associated with the first traffic flow includes at least one of:

a Transmission Control Protocol ("TCP"), or a User Datagram Protocol ("UDP").

* * * * *